Feb. 2, 1971   R. LEONARD   3,560,340
PROCESS FOR TREATING BODY FLUIDS
Filed March 11, 1968   3 Sheets-Sheet 1
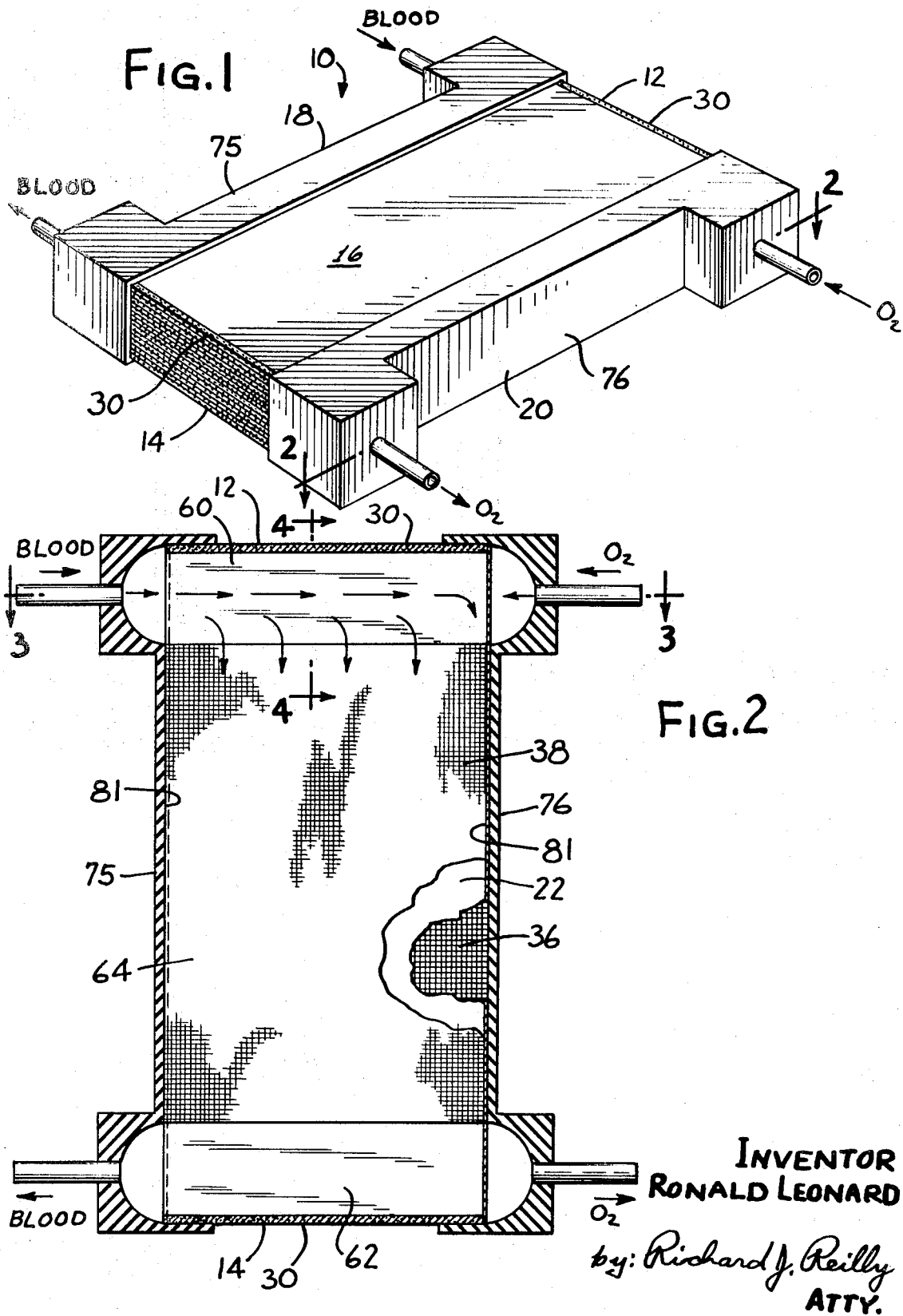

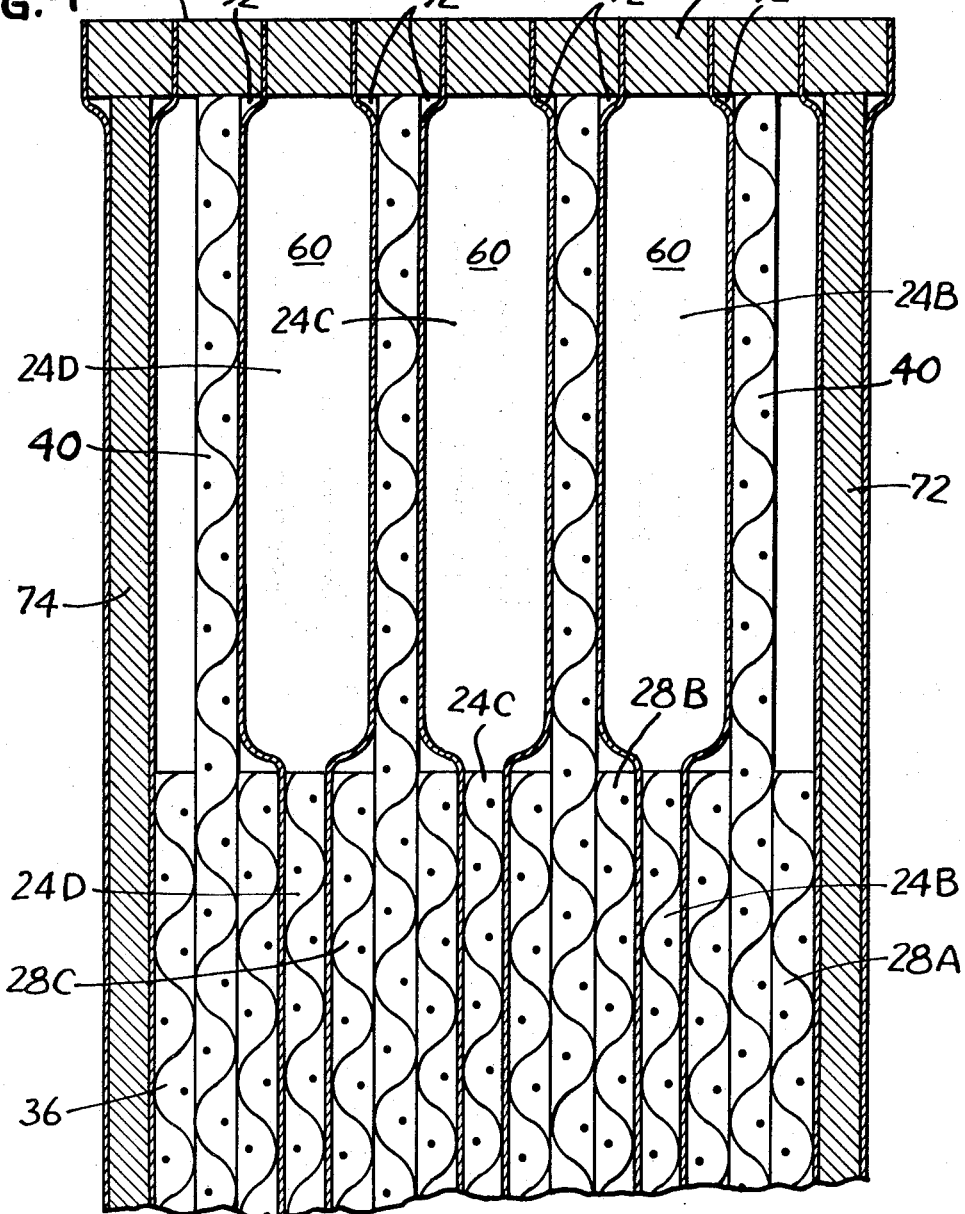

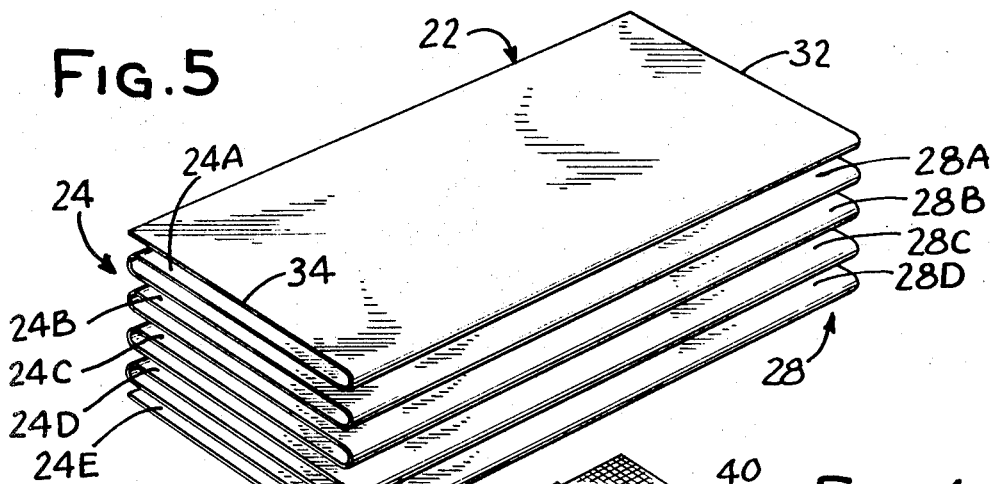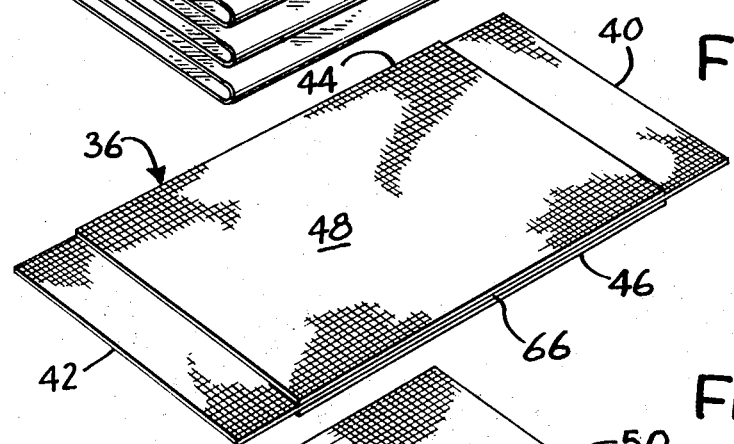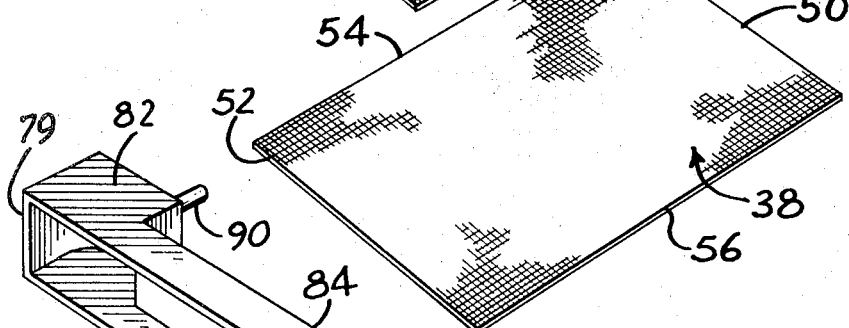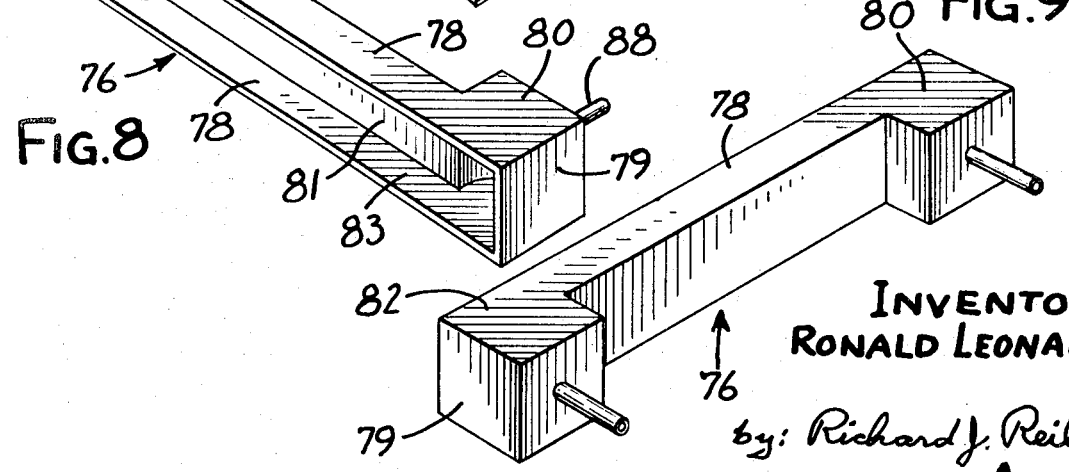

United States Patent Office 3,560,340
Patented Feb. 2, 1971

3,560,340
PROCESS FOR TREATING BODY FLUIDS
Ronald Leonard, Elk Grove Village, Ill., assignor to Baxter Laboratories, Inc., Morton Grove, Ill., a corporation of Delaware
Filed Mar. 11, 1968, Ser. No. 712,066
Int. Cl. C12k 9/00; B01d 13/00
U.S. Cl. 195—1.8
6 Claims

ABSTRACT OF THE DISCLOSURE

A support member in each of two sets of pockets formed by membranous layers, films fluid to minimize variation in resistance to flow causing short circuits. A pair of channels at the upstream and downstream end portions of at least one set of pockets and defined by the support members minimizes resistance to flow of fluid across the input and output end portions of the pockets of such set.

---

The present invention relates to fluid diffusion devices in which material transfer occurs across a selectively permeable membrane disposed between first and second fluids. Particularly the invention relates to a diffusion cell for oxygenating or dialyzing blood by fluid passage through a laminous structure, such as that which is provided by a continuous folded or pleated selectively permeable membrane.

A heretofore known device of the class with which the present invention is concerned dialyzes blood through an unsupported flexible folded membrane which provides a plurality of parallel flow paths for blood along one face of the membrane and a plurality of countercurrent flow paths for dialyzing fluid along the other face of the membrane. The device is adapted for blood and dialyzing fluid which are moved intermittently and reciprocally by pumping them alternately and countercurrently. In consequence thereof the pockets formed along one face of the membrane fill while the pockets formed along the other face of the membrane empty. The device is itself an effective pump and requires valving for fluid flow in the manner intended. As a result of the constantly alternating condition of the membrane thereto incident variation in blood treatment results. Moreover, because of the required lack of rigidity in the membrane, the likelihood of generating short circuits of the regular paths through the device give rise to an inherent hazard of inadequate blood treatment.

An object of the present invention is the provision of an improved fluid diffusion device of the laminated membrane type for treating blood.

Another object of the invention is to insure uniform fluid flow through a blood oxygenator or blood dialyzer of the designated class.

An additional object of the invention is to improve the oxygen and carbon dioxide exchange characteristics in a fluid diffusion cell.

To effect the foregoing objects, a fluid diffusion cell with a laminated selectively permeable membrane structure has a plurality of oppositely opening pockets which define a pair of sets of parallel flow paths along corresponding surfaces of the laminae of said structure. A fluid inlet member and a fluid outlet member are associated with each set of parallel paths for introducing therein and removing therefrom blood and another fluid separate each from the other by said laminae. A rigid support member is disposed in each pocket for filming therein therethrough flowing fluid, and maximizing fluid contact with said laminae.

How to further accomplish the foregoing and other objects, features and advantages of the invention will become more apparent upon consideration of the following description and appended claims, when considered in conjunction with the accompanying drawings wherein the same reference character or numeral refers to like or corresponding parts throughout the several views.

On the drawings:

FIG. 1 is a perspective view of a diffusion cell embodying the present invention.

FIG. 2 is a view according to the second line 2—2 of FIG. 1.

FIG. 3 is a view according to section line 3—3 of FIG. 2, spacer-screens having been omitted for the purpose of illustration.

FIG. 4 is an enlarged view of a section according to the line 4—4 of FIG. 2.

FIG. 5 is a perspective view of a folded membrane comprising the diffusion cell.

FIG. 6 is a perspective view of one type of spacer-screen comprising the diffusion cell.

FIG. 7 is a perspective view of another type of spacer-screen comprising said diffusion cell.

FIG. 8 is a perspective of a manifold for supplying fluid in said diffusion cell viewed from one aspect.

FIG. 9 is a perspective of said manifold viewed from another aspect.

Referring now more particularly to the drawings, a fluid diffusion cell generally designated 10 (FIG. 1) is illustrated herein as a device for treating a body fluid such as blood. For the purpose of orientation, cell 10 may be considered as having a top end portion 12, a bottom end portion 14, a front face 16, a thereto parallel back face (not shown) and opposed lateral sides, being a blood side 18 and a side 20 for another fluid.

Cell 10 comprises a laminated membranous structure having parallel laminae which may be formed by the courses of a preferably flexible and selectively permeable membrane 22 (FIG. 5). The latter is folded or pleated to provide a first set 24 of pockets 24A, 24B, 24C, 24D and 24E which open outwardly toward the blood side 18, and a second set 28 of pockets 28A, 28B, 28C and 28D which open outwardly toward the other side 20. The pockets of each set define parallel flow paths along corresponding surfaces of the laminae.

Membrane 22 is fabricated preferably of a biologically inert base, such as a mesh of fiber glass or Dacron about .005 inch thick. Over the latter there is applied a very thin cover of an elastomer, preferably silicone rubber, sufficient only to fill the spaces defined by the mesh. In a preferred process for the cell, membrane 22 is pleated into oppositely directly membranous courses or layers to form uniformly dimensioned pockets about a plurality of rectangular parallel forming plates (not shown). The latter are supported in horizontal array for separating adjacent courses or pleats by about .040 inch. Thereafter, the top edge portions 32 of the pleats forming top end portion 12 of the cell and the bottom edge portions 34 of the pleats forming bottom end portion 14 of said cell are sealed together in fixed and spaced apart relationship with a sealing material 30. In consequence, sealed top and bottom ends of said pockets are formed. An RTV silicone rubber provides a suitable sealing material and imparts reasonable rigidity to top and bottom end portions 12 and 14 of the cell. Rubber sealing is preferred to metal ties and performed sealing components because its use minimizes production costs.

The structure thus formed enables separation of blood and another fluid for flow in respective parallel flow paths along corresponding faces of the membranous laminae by which such fluids are completely separated. In consequence of the foregoing, the flow of blood can be confined to the pockets of one set (herein set 24) and the flow of the other fluid can be confined to the pockets of the other set (herein set 28). When cell 10 is an oxygenator, as shown herein, the other fluid will be oxygen. However, the device is not limited to oxygenators and may be employed with equal effect as a dialyzer. In that event the other fluid would be a dialyzing liquid.

After sealing the top and bottom end portions 12 and 14, the rectangular forming plates (not seen) are withdrawn from the pockets. Thereafter, a support member 36 of a first type, and herein comprising a spacer-screen which is substantially the same height and width as a pocket and of rectangular profile, is inserted into each of the oxygen pockets (the pockets of set 28). A support member of a second type, and herein comprising a spacer-screen 38 which is of rectangular profile and about the same width as a pocket but shown as being shorter than the same, is inserted into each of the blood pockets (the pockets of set 24).

Spacer-screen 36 has a top section 40, a bottom section 42, a medial section 66, opposed lateral side portions 44 and 46, and a top surface 48. Spacer-screen 38 has a top portion 50, a bottom portion 52, opposed lateral side portions 54 and 56, and a top surface 58. The length and width of each last spacer-screen is substantially the same as the corresponding dimensions of a medial section 66. Each pocket has the same height and width as the others; and as illustrated in FIG. 2, which shows the interior of a blood pocket, each pocket is characterized by an upper end portion 60, a thereto opposed lower end portion 62 and a medial portion 64. While each spacer-screen 36 extends substantially the entire length (between top and bottom) of the pocket in which it is disposed, each spacer-screen 38 is proportioned for disposition only in the medial portion 64 of its pocket and extends neither into the associated top portion 60 nor into bottom portion 62. In the illustrated embodiment, although the depth of each pocket (distance between adjacent laminae) preferably is .040 inch, immediately after setting as aforesaid, the depth of each spacer-screen 38 is .020 inch. On the other hand, medial section 66 of each spacer-screen 38 is .060 inch while its top and bottom end sections 40 and 42, which are substantially of the same length are .020 inch. By reason of the foregoing spacer-screen 36 can be considered as having an enlarged medial section or reduced end sections.

Each spacer-screen 36 may be a mesh of fiber glass fabrication covered with vinyl of a thickness insufficient to mask its screen character. Each spacer-screen 38, on the other hand, preferably is of plastic fabrication, fashioned from low density polyethylene by extrusion.

In lieu of spacer-screens, a pair of rectangular rigidifying elements 72 and 74 (FIG. 4) may be inserted or disposed in pockets 24A and 24E. These members preferably are about .020 inch thick and of an area for filling their pockets. They are of any suitable construction, such as fiber glass reinforced with phenolic plastic.

A pair of preferably like structured manifolds, only one of which is shown in FIGS. 8 and 9, comprise a blood manifold 75 and an oxygen manifold 76. They respectively are mounted on cell sides 18 and 20. Each manifold has a pair of spaced apart, top and bottom like proportioned, inlet and outlet, end receptacles or wells 80 and 82 which are connected together by an integral medial section 84. Each inlet well 80, together with an inlet duct 88 comprises inlet means whereas each outlet 82 together with an outlet duct 90 comprises outlet means. Moreover, each manifold has (1) a pair of parallel front and rear walls 78, the opposite top and bottom portions of which define the front and rear faces of said wells, and (2) a pair of parallel top and bottom walls 79 which define the top and bottom, respectively, of wells 80 and 82. Furthermore, medial section 84 of each manifold has an inwardly offset flat surface 81 which together with walls 78, 78 and walls 79, 79 define a chamber or trough 83 for reception of an associated side of the folded membrane with therein disposed spacer-screens. The parts are proportioned so that (1) the walls 78, 78 of each manifold, on its respective side, engage front and rear surfaces of the folded membrane, (2) walls 79, 79 of each manifold engage the seals 30 at the top and bottom of the membrane, and (3) each flat surface 81 engages against the medial section of its associated side of the pockets, when the cell is assembled. In such condition all adjoining surfaces are secured together, preferably with an RTV material for sealing silicone rubber from which the manifolds preferably are fabricated.

As a result of the foregoing, the inner surface 81 of manifolds 75 is secured along side 18 to the folds defining pockets 28A, 28B, 28C and 28D and closes the medial sections of the openings of the pockets of set 24 toward side 18 while leaving the upper and lower end portions 60 and 62 of said last pockets arranged in immediate fluid communication with wells 80 and 82 of said last manifold. Similarly, inner surface 81 of manifold 76 is secured along side 20 to the folds of pockets 24A, 24B, 24C, 24D and 24E, and closes the medial sections of the openings of the pockets of set 28 toward side 20 while leaving the upper and lower portions 60 and 62 of said last pockets arranged in immediate fluid communication with wells 80 and 82 of the last mentioned manifold.

The illustrated cell is adapted for supplemental and support oxygenation of blood. To that end, the blood inlet and outlet means are adapted for connection to the circulatory system of an individual to be serviced, respectively, for receiving and for returning blood from and to such individual without the assistance of an auxiliary pump. The parts in each blood pocket are arranged for moving blood according to directional arrows (FIG. 2) from blood inlet well 80, at which the upstream end or opening of each blood pocket immediately is disposed, along the upper portion 60 of such pocket and therefrom downstream through a corresponding lower portion 62 for return from blood outlet well 82 at which the downstream end or opening of each pocket immediately is disposed. The oxygen manifold 76 and oxygen pockets (of set 28) may be similarly arranged for flow in its pockets. However, in a dialyzer flow of blood and the other fluid preferably will be in countercurrent paths.

As illustrated in FIG. 4, the opposite surfaces of each spacer-screen is engaged by an adjoining lamina. This arrangement results in the development of a pair of enlarged opposed channels having end openings and defined in each blood pocket at its upper and lower end portions 60 and 62. These openings are disposed for immediate communication with blood inlet and outlet means of manifold 75; and the channels herein are about .060 inch in depth and extend across the top and bottom of the cell from side to side adjacent seals 30. They provide resistance of no practical significance whereby blood entering the cell rapidly flows across the tops of all of the blood pockets and the flow of blood leaving is not needlessly impeded. The depth of the medial portion 64 of each blood pocket is limited to .020 inch, the depth of its blood spacer-screen, against which a pair of laminae are held by the medial sections 66 of adjacent spacer-screens 36. This causes the blood to be spread in a very fine film, as a consequence of which, oxygen exchange, which is a function of blood film thickness, is exceedingly rapid.

The cell is constructed so that almost maximum oxygenation can occur with laminae of minimum total surface area in sections 64 of the blood pockets and while maintaining desired output of blood introduced under blood pressure of an individual being treated. Such surface area, however, is inadequate for liberation of all the $CO_2$ from normal venous blood. Additional surface area required for adequate $CO_2$ elimination from the blood is provided by the sections of the laminae which define end portions 60 and 62 of the blood pockets. An efficient cell has an exchange surface area in the channel portions 60 and 62 of the blood pockets which is not less than about 15% of the exchange surface area of the blood filming portions of the cell.

In the oxygen pockets adjacent the blood channels a plurality of canals 92 (FIG. 4), which extend from side to side parallel to the blood channels, develop at the front and back of screen sections 40 and 42 because of the depth of said screen sections and the spacing of the laminae whose top and bottom edges are anchored in fixed relationship. Canals 92 form easy entries into and exits from the oxygen pockets and are disposed at respective oxygen inlet and outlet wells 80 and 82.

In addition to providing great efficiency in oxygenating and dialyzing blood, the invention enables construction of a cell at substantially less cost than related heretofore known devices of the same type. This last feature is highly significant in facilitating widespread enjoyment of the invention.

What is claimed is:

1. In a process for selectively diffusing relative a body fluid a first material and a second material through a membrane, a combination of steps comprising:
    moving the body fluid in a first course;
    moving a second fluid for transferring material across said membrane and in a second course adjacent the first course;
    diffusing principally the first material across said membrane at select portions of said first course, and
    diffusing principally the second material across said membrane at another portion of said first course.

2. A process according to claim 1 characterized by applying pressure generated in the body whose fluid is being treated for moving the body fluid.

3. A process according to claim 1 in which the steps of moving said body fluid and said second fluid comprises dividing said fluids into a set of parallel first layers of said body fluid and a set of parallel second layers of said second fluid disposed about said first layers.

4. A process according to claim 1 in which the select portions are at least one of the upstream and downstream end portions of said course, and the other portion is medially of said upstream and downstream end portions.

5. A process according to claim 4 in which the step of diffusing principally said first material results from utilizing widened upstream and downstream ends of the first course relative to the width of the medial portion of said first course, to provide a thicker stream of fluid at said upstream and downstream ends.

6. A process according to claim 5 in which the step of diffusing principally the second material results from filming said body fluid.

References Cited

UNITED STATES PATENTS 3,396,849     8/1968     Lande et al. _____ 210—321

OTHER REFERENCES

Esmond et al., "Design and Application of a Disposable Stainless Steel Blood Heat Exchanger With the Integrated Disposable Plastic Disc Oxygenation System," from Trans. Amer. Soc. for Artif. Internal Organs, vol. 6, 380 pages, pp. 360–369 relied on, held Apr. 10 and 11, 1960.

FRANK A. SPEAR, JR., Primary Examiner

U.S. Cl. X.R.

210—22